May 20, 1924.

K. R. SCHUSTER

FISHING REEL

Filed Nov. 28 1921

1,494,933

INVENTOR.
Karl R. Schuster
By W. L. Bernhard
Attorney.

Patented May 20, 1924.

1,494,933

UNITED STATES PATENT OFFICE.

KARL R. SCHUSTER, OF BROOKLYN, NEW YORK.

FISHING REEL.

Application filed November 28, 1921. Serial No. 518,136.

*To all whom it may concern:*

Be it known that I, KARL R. SCHUSTER, residing at the city of New York, borough of Brooklyn, county of Kings, and State of New York, have invented a certain new and useful Fishing Reel, of which the following is a specification.

This invention is a fishing reel wherein provision is made for winding the line during periods of twilight, i. e., or at times when there is not sufficient natural light to detect the direction of the line, with a view to overcoming the normal tendency of the line to become coiled in an irregular manner upon the spool, as a result of which irregular winding there is established an objectionable "back lash" leading frequently to entanglement of the line and causing annoyance and delay.

It is a custom of anglers to fish in the twilight and to throw the line out to a distance in a manner known as casting; but in such periods of semi-darkness or darkness, the angler is troubled with a "back lash" of the line which becomes improperly wound upon the spool for the reason that during the absence of light, as in semi-darkness or darkness, the angler cannot observe the precaution of winding the line regularly and uniformly upon the spool.

Broadly stated, my invention embodies means associated with the reel or appurtenant thereto for affording a contrast between the line and said means whereby in periods of darkness or semi-darkness the line is rendered visible to the angler as an aid in directing the line in a path which assures regular and proper winding of said line upon the spool. By the term darkness or semi-darkness as used in this description I refer to that condition prevailing during the night time or during twilight, i. e., the absence of a source of natural light wherein objects are invisible, more or less, to the eye. To overcome the handicap to the angler in reeling the line on the spool, provision is made for detecting the direction or position of the line with respect to the spool during such periods when natural light is absent. Such line detecting means in certain forms of the invention are of a character to render the line visible in semi-darkness, whereas in another form of the invention, wherein a luminous coating such as radium material is used, provision is made for the detection of the line relatively to the spool during periods of darkness, or, indeed, of almost total darkness. Said means affording a contrast in color to the line, may be embodied in various constructional forms so as to be incorporated as an elemental part of the reel or as an attachment to said reel, either to reels now in existence or to reels newly manufactured to embody said improvement. Generally stated, the improvement is a member of a white, or substantially light, color so as to secure the required contrast with a dark line, whereby in the semi-darkness the position and direction of the line with respect to the spool is plainly visible. The white or light color of the line-detecting element may be imparted thereto by a coating of enamel, paint, luminous or otherwise, a coat of radium material, or by the aid of a reflecting or mirror surface.

It has been found by experience that a white enameled plate supported by the reel frame and positioned close to the spool for the line to run contiguous thereto, is amply sufficient as an aid to the angler during periods of semi-darkness in detecting and governing the run of the line so as to wind it uniformly and regularly upon the spool; and for practical purposes my invention is embodied in the form of a light colored plate mounted permanently on the reel frame or, if desired, detachably attached thereto.

In the drawings—

Figure 1:
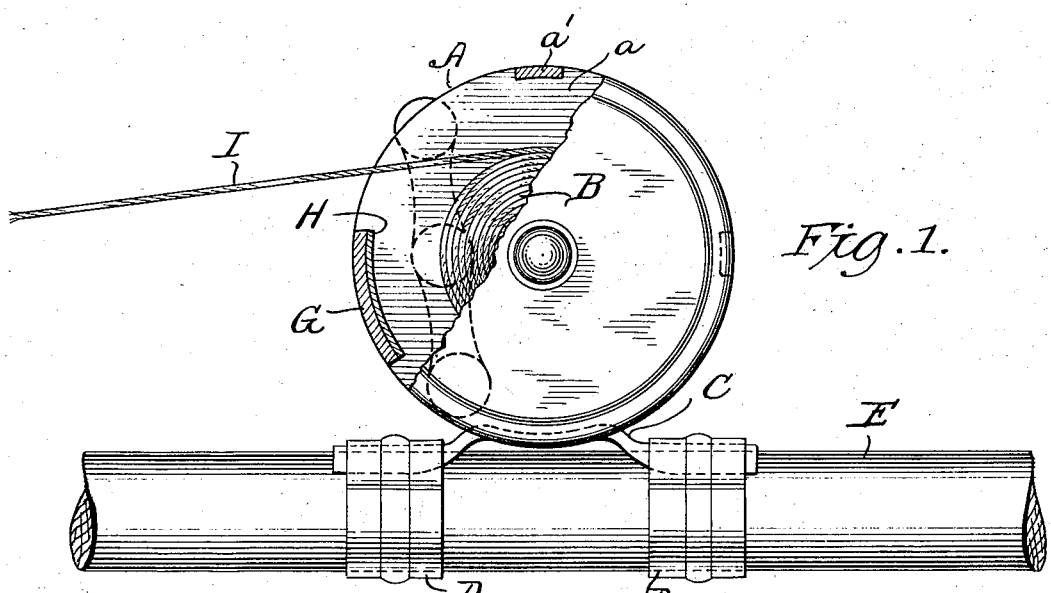
Figure 1 is an elevation of a part of a pole with a reel applied thereto, the latter having a line-detecting element in accordance with the invention.

A is a reel frame composed as usual of heads $a$ and cross members $a'$, and B is the rotary spool journaled in a desired manner in the heads. In Figure 1 the reel is mounted by a clip plate C and bands D upon a pole E, but as the foregoing parts are usual in the art, no further description is necessary.

According to the embodiment of my invention shown in Figure 1, the line-detecting element G is a plate provided with a light colored surface H, said plate being a part of reel frame A and positioned in such relation to the spool B that the surface H is in the line of vision of the angler, whereby the line I will run contiguous to said surface H so that a contrast in color between the line and the surface will render the line plainly visible to the angler in the twilight. As shown, the plate G is of arcuate form and is produced by an enlargement of one of the cross members a' of the reel frame.

Obviously, the member G is a fixture on the reel frame so as to constitute an integral part thereof. The light surface H is of a desired character, obtainable by applying a coating of white enamel, white paint, luminous paint, radium material, or other appropriate media, although the white color is not essential for the reason that a permanently white surface will answer the requirements.

Figure 2:
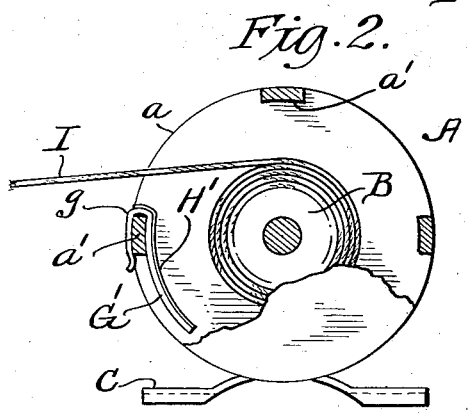
Figures 2, 3 and 4 are views in elevation partly in section of other reels equipped with different constructional forms of line-detecting elements according to my invention.
Figure 3:
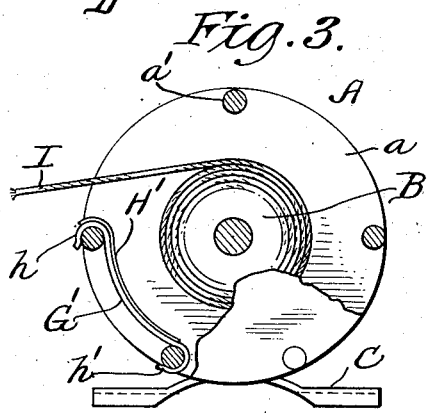

In Figures 2 and 3, the element G' with the white colored surface H' is in the nature of an attachment to the reel, whereby my improvement may be applied to existing reels. The part G' is a curved plate which in Figure 2 is provided with a clip g at one end for engagement with one cross member a' of the reel frame, whereas in Figure 3 the plate G' is provided at opposite edges with clips h, h', respectively, adapted for frictional contact with a plurality of the cross members a' of said reel frame so as to retain the plate G' fixedly in position on said reel frame in the required position contiguous to the spool.

Figure 4:
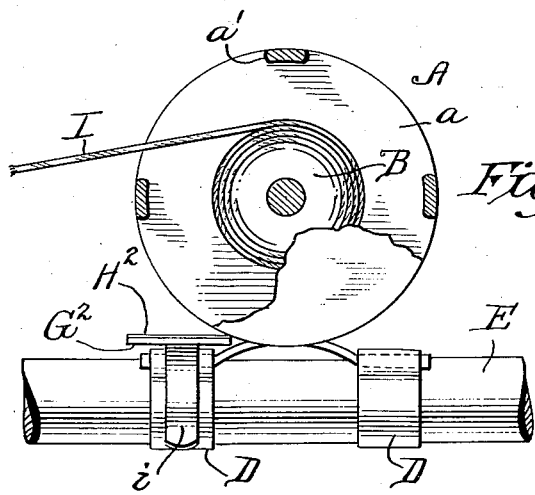
Figure 5:
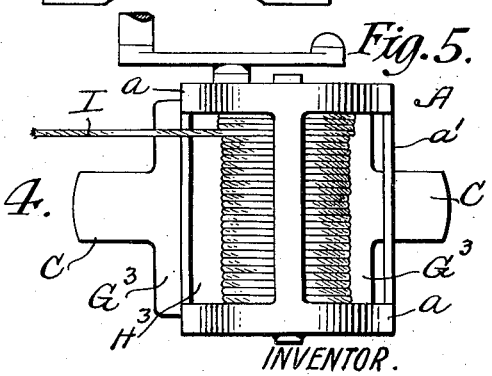
Figure 5 is a plan view of a reel with another form of line-detecting element.

It is not required that the line-detecting element be a part of the reel frame, for the reason that the sides of the spool may be provided with white or reflecting surfaces, and in Figures 4 and 5 there are shown other forms of the invention wherein said detecting element is associated with a part for use in connection with pole E. As depicted in Figure 4, the line-detaching element $G^2$ is a part of a clip i for frictional contact with one of the bands D, whereby the element is positioned contiguous to the spool and in the line of vision of the angler. Again, the pole plate C may be modified in construction as in Figure 5 so as to embody the line-detecting element $G^3$, the latter extending below the spool B so as to be visible on opposite sides thereof, said plate C being fashioned as usual for snug application to the pole and said plate C being expanded in width intermediate the ends so as to result in the detecting element $G^3$.

As stated, the white or light surface on the line-detecting element is not necessarily embodied in a coating of enamel or paint, and in Figure 4 the surface is shown as a reflector or mirror $H^2$ provided on the exposed face of the element $G^2$, said reflecting surface being contiguous to the spool and the line and lying in the line of vision of the angler.

As will be understood, the line-detecting element $G^3$ of Figure 5 is provided with a light surface $H^3$ either by the application of a coating or the provision of a reflecting or mirror surface.

Although I have shown and described various constructional forms of line-detecting elements associated with the reel frame and the clip plate, it is to be understood that the invention is not restricted in its scope to either of said embodiments, for the reason that it comprehends any means whereby the line may be rendered visible to the angler during periods of darkness or semi-darkness, i. e. at such time or times as there is an absence of natural light, or sufficient natural light, to render visible to the angler the relation or direction of the line with respect to the spool.

Having thus fully described the invention, what I claim as new and desire to secure by Letters Patent is:

1. A fishing reel provided with means contiguous to the spool and to the path of a line for affording a contrast in color to the line so as to render the latter visible to an operator.

2. A fishing reel provided with a line-detecting element affording a contrast to the line and positioned contiguous to the spool so as to render said line visible to an operator.

3. A fishing reel provided with a line-detecting element constituting a fixture of said reel and positioned contiguous to the spool, said line-detecting element presenting to the vision of the operator a surface contrasting to the line.

4. A fishing reel provided with a line-detecting element attachable to and demountable from a part of said reel, said element being provided with a surface affording a contrast to the line and positioned contiguous to the reel.

5. A fishing reel provided with a line-detecting element positioned contiguous to the spool, said element being provided with a coated surface affording a contrast to the line and operating to render said line visible to an operator.

6. In a fishing reel, the combination with a frame and a spool, of a line-detecting element provided with a clip engageable with a part of said reel frame, said element having a surface contiguous to the spool and affording a contrast to the line for rendering the latter visible to an operator.

In testimony whereof I have hereto signed my name this 24th day of November, 1921.

KARL R. SCHUSTER.